(12) United States Patent
Jochym et al.

(10) Patent No.: US 7,394,652 B1
(45) Date of Patent: Jul. 1, 2008

(54) PERIPHERAL CARD ADAPTER

(75) Inventors: Daniel A. Jochym, Downingtown, PA (US); Sean M. McClain, Havertown, PA (US); Mark W. Wessel, Media, PA (US); Kenneth J. Neeld, West Chester, PA (US); Keith D. Mease, Gibbstown, NJ (US)

(73) Assignee: Unisys Corporation, Blue Bell, PA (US)

( * ) Notice: Subject to any disclaimer, the term of this patent is extended or adjusted under 35 U.S.C. 154(b) by 12 days.

(21) Appl. No.: 11/540,462

(22) Filed: Sep. 29, 2006

Related U.S. Application Data (60) Provisional application No. 60/722,161, filed on Sep. 30, 2005.

(51) Int. Cl.
  *G06F 1/16* (2006.01)
(52) U.S. Cl. .................. 361/685; 710/301; 439/638
(58) Field of Classification Search .......... 710/129, 710/103, 301; 439/159, 490, 638, 326; 361/679–687, 361/724–727
  See application file for complete search history.

(56) References Cited

U.S. PATENT DOCUMENTS

| | | | |
|---|---|---|---|
| 6,408,352 B1* | 6/2002 | Hosaka et al. .............. | 710/301 |
| 6,772,246 B2 | 8/2004 | Kim et al. | |
| 6,824,413 B1* | 11/2004 | Shipe et al. ................. | 439/326 |
| 6,824,431 B2 | 11/2004 | Shimada et al. | |
| 7,069,369 B2* | 6/2006 | Chou et al. ................. | 710/301 |
| 2004/0242040 A1* | 12/2004 | Miyazawa et al. .......... | 439/159 |

* cited by examiner

*Primary Examiner*—Hung V Duong
(74) *Attorney, Agent, or Firm*—Richard J. Gregson; Robert P. Marley; RatnerPrestia (57) ABSTRACT

Card adapter modules and methods for connecting peripheral cards to computing systems are disclosed. The card adapter modules each include a card connector, a peripheral connector, and a housing that supports the card connector and peripheral connector. A peripheral card is connected to a computing system having a chassis with an input/output slot by inserting the peripheral card along a first insertion axis (y-axis) into a card connector of a card adapter module and inserting the card adapter module along a second insertion axis (x-axis) extending through the input/output slot to a platform connector of a computing platform within the computing system. The card connector is electrically connected to the peripheral connector.

18 Claims, 9 Drawing Sheets

PERIPHERAL CARD ADAPTER

RELATED APPLICATION

This application claims priority to U.S. Provisional Patent Application Ser. No. 60/722,161 filed on Sep. 30, 2005, which is incorporated fully herein by reference.

FIELD OF THE INVENTION

The present invention relates to computer systems and, more particularly, to methods and apparatus for installing peripheral cards (e.g., input/output and expansion boards) into computing systems such as personal computers, servers, workstations, and the like.

BACKGROUND OF THE INVENTION

Peripheral cards are printed circuit boards that connect to a motherboard of a computing system in order to expand the functionality of the computing system. To insert a peripheral card into the computing system or remove a peripheral card therefrom, the cover of a chassis containing the computing system must be removed. In the case of servers, this is difficult because there may be numerous cables connected to the server that need to be disconnected such that the server can be removed from a cabinet holding the server before the cover can be removed. Depending on the number and types of cables that need to be disconnected, this may be a time consuming operation.

Recently, there has also been a movement toward "hot swappable" peripheral cards. "Hot swappable" peripheral cards such as PCI Express (PCIe) cards allow such cards to be inserted or removed from a motherboard while the computing system is powered on. Several issues exist with current peripheral card design and the ease of hot swappable replacement. For example, with the cover removed from a computing system chassis in order to insert/remove/replace a peripheral card, there is reluctance to service a computer system that is powered on for fear of electrical shock or causing damage to the system. Thus, service technicians typically shut down the system to add or replace peripheral cards, thereby defeating the purpose of the "hot swappable" feature.

For the above reasons, there is a need for improved apparatus and methods for installing peripheral cards into computing systems. The present invention addresses this need among others.

SUMMARY OF THE INVENTION

The present invention is embodied in apparatus and methods for electrically connecting a peripheral card to a computing platform through an input/output slot in a chassis housing the computing platform. In accordance with one aspect of the invention, a card adapter module is provided for electrically connecting a peripheral card to a computing platform. The computing platform has at least one platform connector and the card adapter module includes a card connector, a peripheral connector, and a housing. The card connector is adapted to receive the peripheral card along a first insertion axis. The peripheral connector is electrically connected to the card connector and is adapted to receive the platform connector on the computing platform along a second insertion axis extending through the input/output slot of the chassis, where the second insertion axis is different than the first insertion axis. The peripheral card is electrically coupled to the computing platform when the card connector receives the peripheral card and the peripheral connector receives the platform connector. A housing supports the card connector and the peripheral connector.

In accordance with another aspect of the invention, a computing system is provided. The computing system includes a chassis having an input/output slot, a computing platform housed within the chassis, and a card adapter module. The computing platform has at least one platform connector, and the card adapter module electrically connects a peripheral card to the computing platform. The card adapter module includes a card connector, a peripheral connector, and a housing. The card connector is adapted to receive the peripheral card along a first insertion axis and the peripheral connector is adapted to receive the platform connector on the computing platform along a second insertion axis extending through the input/output slot of the chassis, the second insertion axis different than the first insertion axis. The peripheral card is electrically coupled to the computing platform when the card connector receives the peripheral card and the peripheral connector receives the platform connector. A housing supports the card connector and the peripheral connector.

In accordance with another aspect of the invention, a method for electrically connecting a peripheral card to a computing platform within a computer chassis is provided. The computer chassis has an input/output slot for receiving a card adapter module and the computing platform has at least one platform connector. The method includes inserting a peripheral card into a card connector of the card adapter module along a first insertion axis, inserting the card adapter module into the input/output slot in the computer chassis along a second insertion axis extending through the input/output slot of the computing system chassis, the second insertion axis different than the first insertion axis, and connecting a peripheral connector of the card adapter module to a platform connector on the computing platform through insertion of the card adapter module along the second insertion axis.

BRIEF DESCRIPTION OF THE DRAWINGS

The invention is best understood from the following detailed description when read in connection with the accompanying drawings, with like element s having the same reference numerals. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

The invention will next be described with reference to the figures. Such figures are intended to be illustrative rather than limiting and are included herewith to facilitate the explanation of the present invention.

Referring generally to the drawings (FIGS. 1-8), in accordance with an exemplary embodiment, a card adapter module 200 is provided having a card connector 203, a peripheral connector 205, and a housing 206. The card adapter module 200 is configured to receive a peripheral card 100 along a first insertion axis (e.g., y-axis) such that a board connector 102 of a printed circuit board 101 connects with the card connector 203. After the peripheral card 100 is secured within the card adapter module 200, the module 200 is inserted into an input/output slot 201 of a computing system 230 along a second insertion axis (e.g., x-axis) that extends through the input/output slot 201, where the second insertion axis (e.g., x-axis) is different than the first insertion axis (e.g., y-axis). The second insertion axis (e.g., x-axis) connects a platform connector 245 on a computing platform 250 to the peripheral connector 205. This arrangement enables the coupling/decoupling of the peripheral card 100 to/from the computing platform 250 without having to remove a cover from the computing system chassis 240. Thus, in the event that the computing system 230 and peripheral card 100 are "hot swappable," which is described in further detail below, the peripheral card 100 is more likely to be inserted/removed/replaced while the computing system 230 is on. Hence, the hot swappable feature is more likely to be used than in conventional systems.

Figure 1:
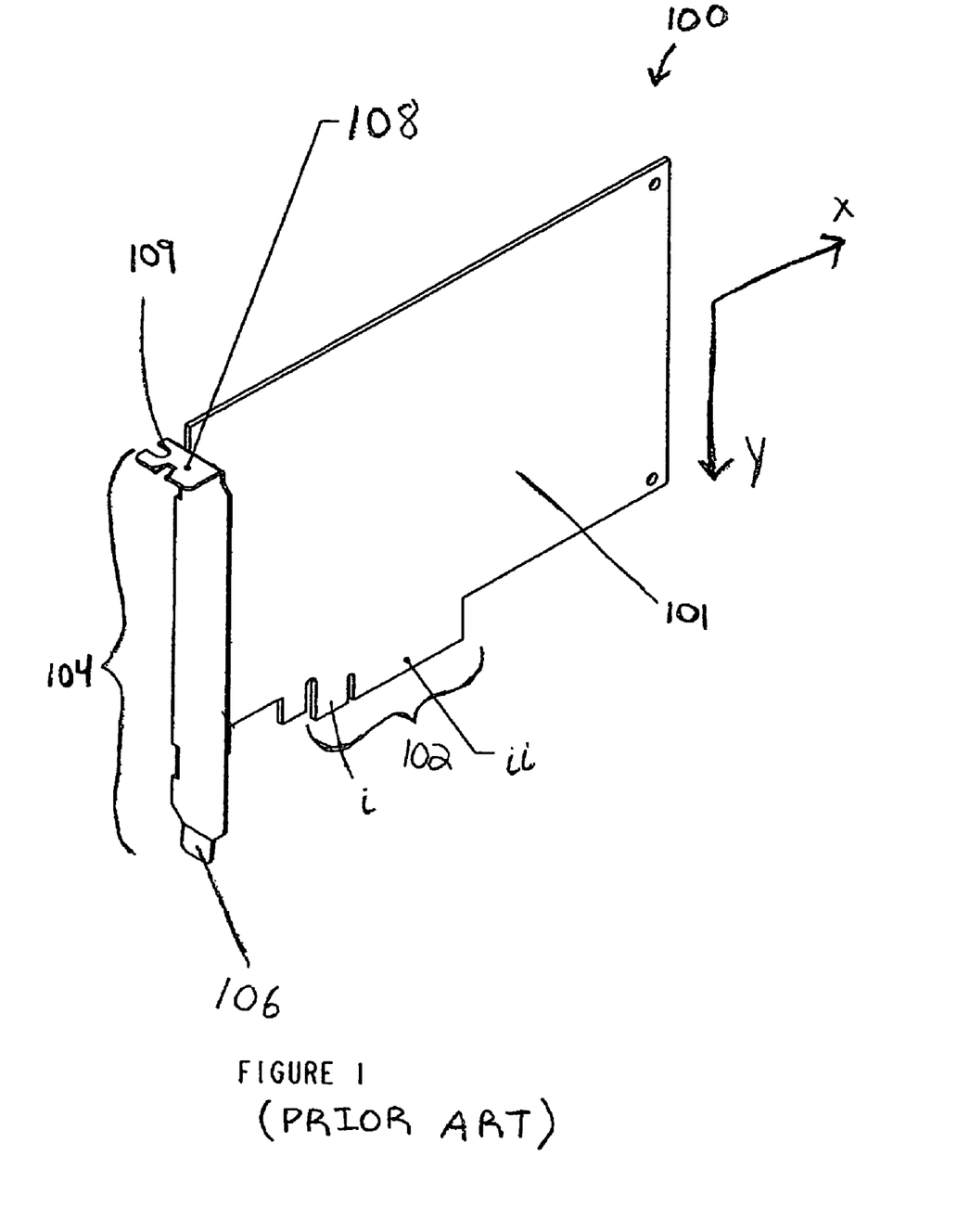
FIG. 1 is a perspective view of a prior art peripheral card.

Referring now to the individual drawings in detail, FIG. 1 depicts a perspective view of a known peripheral card 100, the structure and operation of which are well known in the art for use in computing systems such as personal computers, servers, workstations, and the like. The illustrated peripheral card 100 includes a printed circuit board 101 and a board connector 102 along an edge of the printed circuit board 101. The board connector 102 typically includes a ground contact portion i and a signal contact portion ii to electrically connect the peripheral card 100 to a computing platform (described below).

The peripheral card 100 may further include a card handle 104. The illustrated card handle 104, which is typically fashioned from sheet metal, contains a flange portion 108 on one end and a tab 106 on the opposite end. The illustrated flange portion 108 includes a hole 109 through which a screw (not shown) may be inserted to secure the peripheral card handle 104 to the computing system chassis after the peripheral card 100 has been connected to the computing platform (described below). The peripheral card 100 may be any industry standard peripheral card such as a PCI card, a PCI Express (PCIe) card, an Accelerated Graphics Port (AGP) card, and the like.

Figure 2:
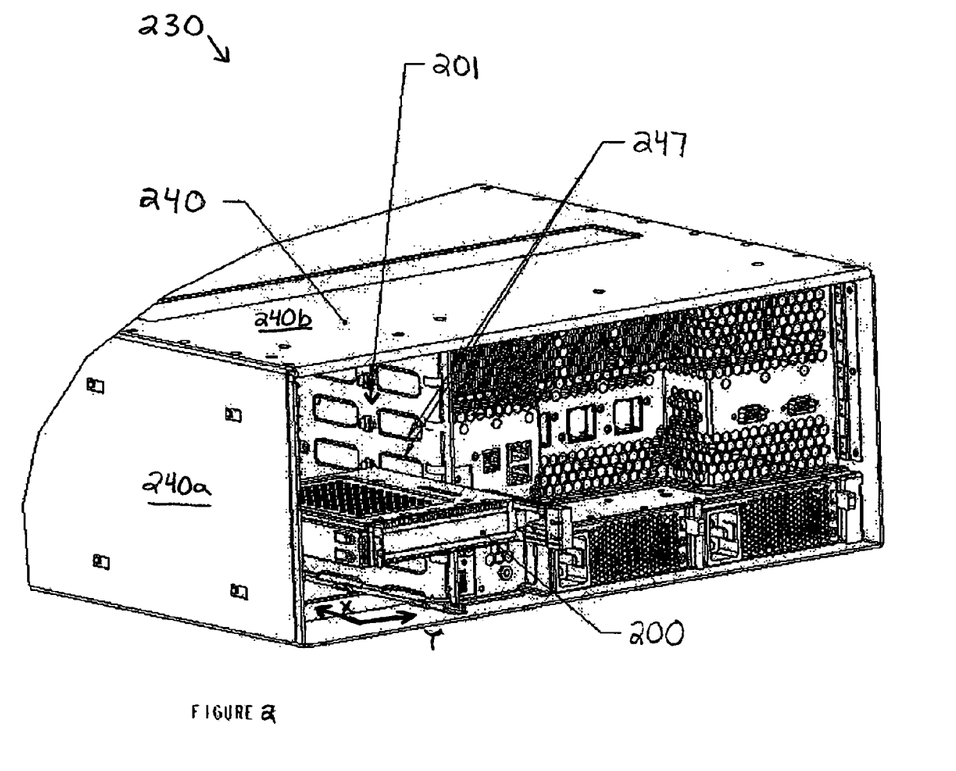
FIG. 2 is a perspective view of a card adapter module being inserted into a computing system chassis in accordance with aspects of the invention.
Figure 2A:
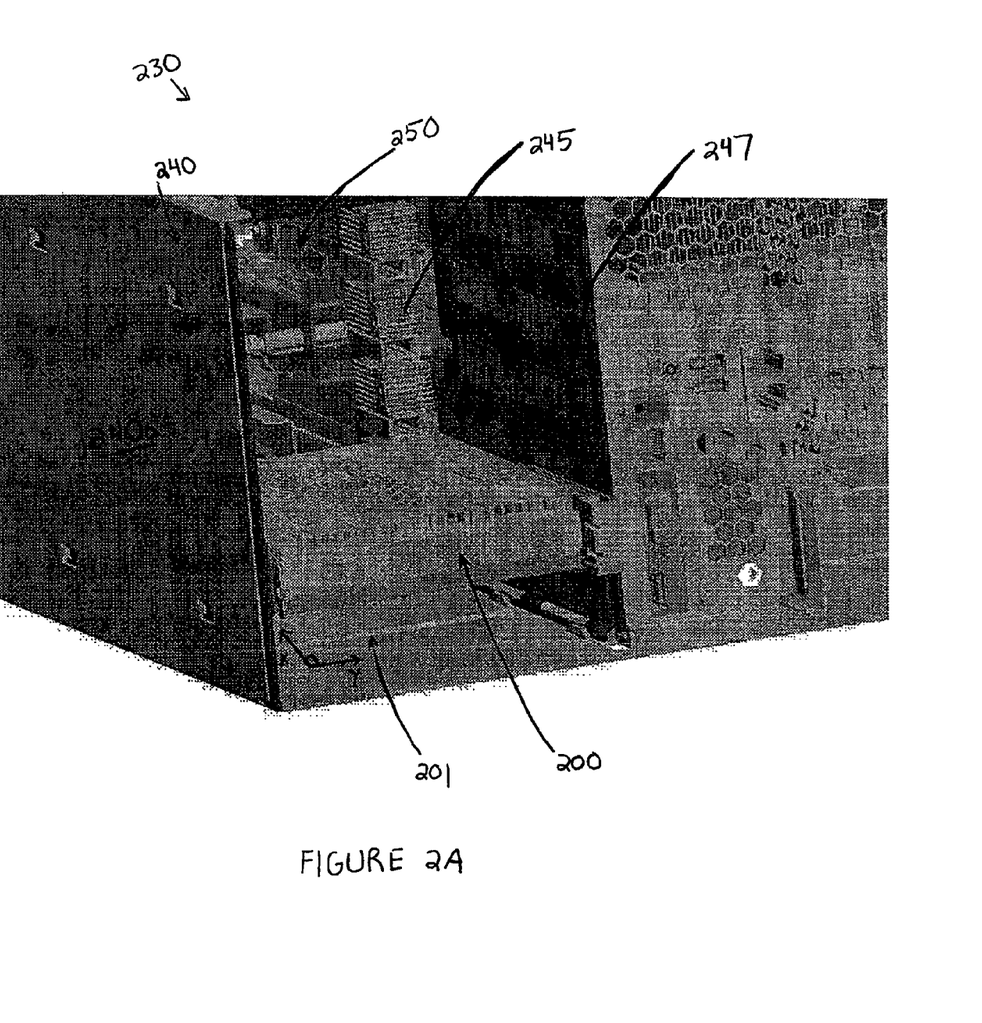
FIG. 2A is a perspective view of a card adapter module fully inserted into a computing system chassis in accordance with aspects of the invention.

FIG. 2 illustrates a perspective view of a card adapter module 200 being inserted into a computing system 230 and FIG. 2A illustrates a computing platform 250 and a platform connector 245 within the computing system 230. The computing system 230 includes a computing system chassis 240 having input/output slots 201 configured to receive card adapter modules 200. A card adapter module 200 is inserted into a respective input/output slot 201 in the computing system chassis 240 along an insertion axis (e.g., x-axis) that extends through the input output slot 201. Insertion of the card adapter module 200 along the insertion axis connects the platform connector 245 of the computing platform 250 to a peripheral connector on the card adapter module 200 (described below). This arrangement enables the coupling of a peripheral card (100, FIG. 1) within the card adapter module 200 to the computing platform 250 without having to remove a cover, e.g., surface 240a and/or surface 240b of computing system chassis 240.

Figure 3:
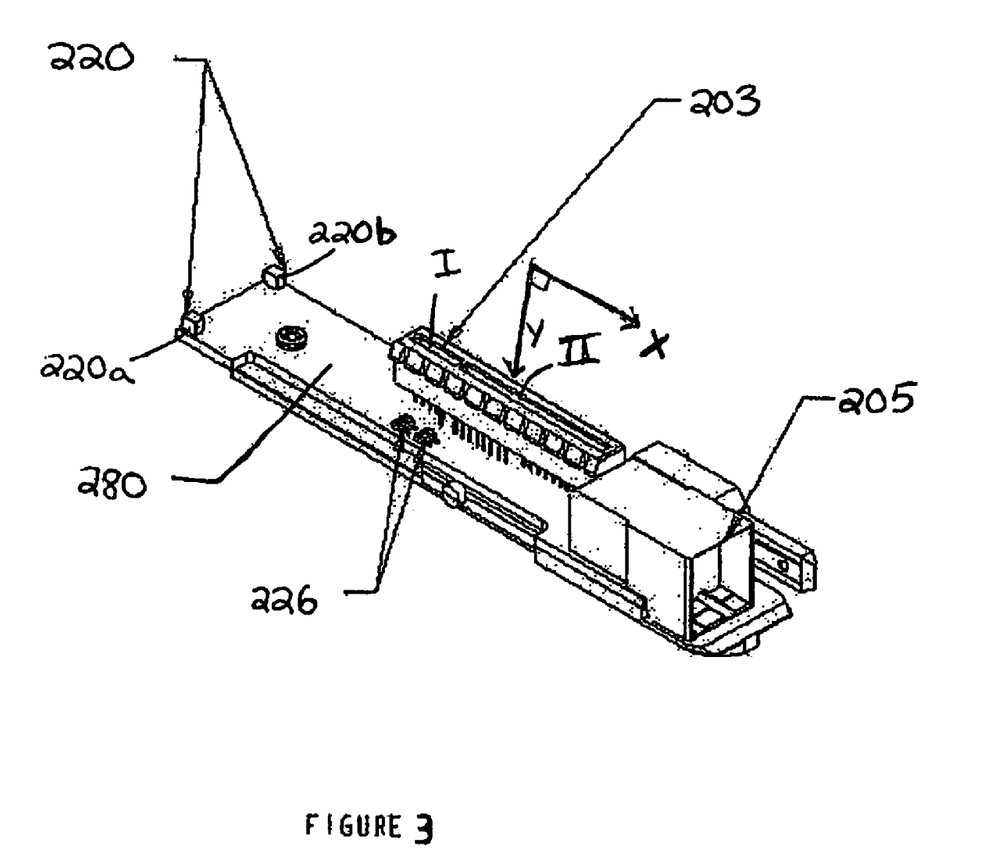
FIG. 3 is a perspective view of components within a card adapter module in accordance with aspects of the invention.

FIG. 3 depicts a perspective view of components of an exemplary card adapter module (200, FIG. 2) in accordance with various aspects of the present invention. The card adapter module 200 includes a card connector 203, a peripheral connector 205, and a circuit assembly 280 (such as a printed circuit board, for example) that interconnects the card connector 203 and the peripheral connector 205. Additionally, the card adapter module 200 may further include light emitting diodes (LEDs) 220 (e.g., a green LED 220a and a red LED 220b) and optical sensors 226. The card connector 203 is adapted to receive a peripheral card (100, FIG. 1) along a first insertion axis, e.g., along the y-axis as shown in FIG. 3. The card connector 203 may include a ground contact portion I and a signal contact portion II on the card connector 203, which are configured to receive respective ground (i, FIG. 1) and signal (ii, FIG. 1) contact portions of the illustrated board connector (102, FIG. 1) of the peripheral card 100. Although the card connector 203 as seen in FIG. 3 is substantially rectangular in configuration, in exemplary embodiments, the card connector 203 may be configured in any shape or dimension to receive a mating board connector of peripheral card 100. For example, the card connector 203 may have industry standard PCIe x1, x2, x4, x8, x12, x16, or x32 connectors.

The peripheral connector 205 is electrically connected to the card connector 203 and is adapted to receive a platform connector (245, FIG. 2A) of the computing platform (250, FIG. 2A) along a second insertion axis, e.g., along the x-axis as shown in FIG. 2, that is different from the first insertion axis. In an exemplary embodiment, the first insertion axis and the second insertion axis are substantially perpendicular with respect to each other. When peripheral card (100, FIG. 1) is connected to the card connector 203 and the peripheral connector 205 is connected to a platform connector (245, FIG. 2A), the peripheral card 100 becomes electrically connected to the computing platform (250, FIG. 2A). As described above for card connector 203, the peripheral connector 205 may also be configured in any shape or dimension to receive a mating platform connector (245, FIG. 2A).

In an exemplary embodiment, status light emitting diodes (LEDs) 220 are electrically connected to at least one of the card connector 203, the peripheral connector 205, or optical sensors 226. The LEDs 220 indicate the current power state of a peripheral card 100 within the card adapter module 200 and when the module 200 may be safely removed from the computing system. When a button/switch/lever (described below) on the card adapter module 200 is optionally pressed/toggled, an electrical signal is sent to the computer system (230, FIGS. 2 and 2A) to indicate that the adapter module 200 and the peripheral card 100 are to be removed. The computer system (230, FIGS. 2 and 2A) may then power down the peripheral card 100 and indicate via the LEDs 220 when the card adapter module 200 and attached peripheral card 100 may be safely removed. This operation will be described in further detail below.

Figure 4A:
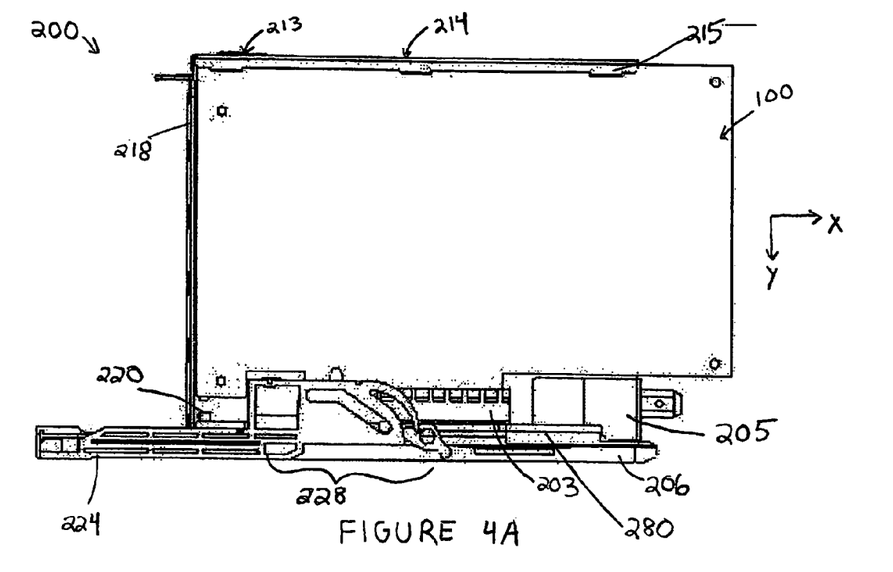
FIGS. 4A and 4B are side views of a card adapter module and lever in accordance with aspects of the invention.
Figure 4B:
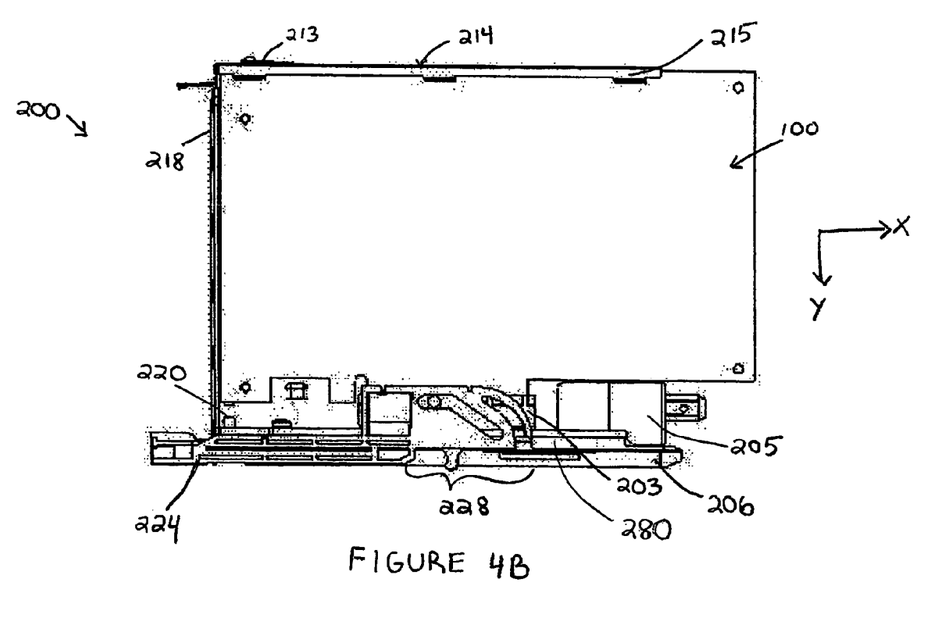

FIGS. 4A and 4B depict side views of a card adapter module 200. The illustrated card adapter module 200 includes a housing 206 to support the card connector 203 and the peripheral connector 205 and to secure the peripheral card 100 within the card adapter module 200, a lever assembly 224, and a cam mechanism 228. The housing 206 may include circuit assembly 280. In FIG. 4A, the lever assembly 224 is in an extracted position, and in FIG. 4B, the lever is in the inserted position. When the lever assembly 224 is in the inserted position, the cam mechanism 228 is compressed, which locks the card adapter module 220 in the computing system chassis (240, FIG. 2) and prevents removal of the card adapter module 200. When the lever is in the extracted position, the cam mechanism 228 is extended, which unlocks the card adapter module 200. Additionally, movement of the lever may cover/uncover a pair of optical sensors (226, FIG. 3) to electrically signal to the computing system (230, FIG. 2) that the card adapter module 200 is going to be withdrawn. The lever assembly 224 may include a light pipe that transfers light from status indicators within the housing 206 to the housing 206 external such as a housing front side portion 218. The light pipe may be formed by making at least a portion of the lever out of a light transferring material.

In an exemplary embodiment, when the lever 224 is fully inserted, the optical sensors 226 are fully covered, which indicates to the computing system (230, FIG. 2) that the card adapter module 200 is coupled to the computing platform (250, FIG. 2A) and the peripheral card 100 within the card adapter module 200 are ready for use. Once the computing system (230, FIGS. 2 and 2A) recognizes the peripheral card 100, the computing system sends an indicator to the card adapter module 200 that causes the green LED 220a to illuminate, thereby indicating to a user, such as service technician, that the card adapter module 200 is properly inserted.

When the lever is partially extracted, at least one of the optical sensors is uncovered, which indicates to the computing system (230, FIGS. 2 and 2A) that the card adapter module 200 is going to be removed. In response, the computing system (230, FIGS. 2 and 2A) begins shutting down the peripheral card and sends an indicator to the card adapter module 200 that causes the red LED 220b to flash, thereby indicating that the user should wait before fully removing the card adapter module 200. Once the computer system (230, FIGS. 2 and 2A) determines that it is safe to remove the card adapter module 200, the computing system (230, FIGS. 2 and 2A) sends an indicator to the card adapter module 200 that causes the red LED 220b to illuminate continuously, thereby indicating that it is safe to remove the card adapter module 200.

When the lever is fully extracted, one or more additional optical sensors 226 are uncovered, which causes power to be withdrawn from the card adapter module 200. Suitable software and hardware for configuring the card adapter module 200 in this manner will be understood by one of skill in the art from the description herein.

Figure 5:
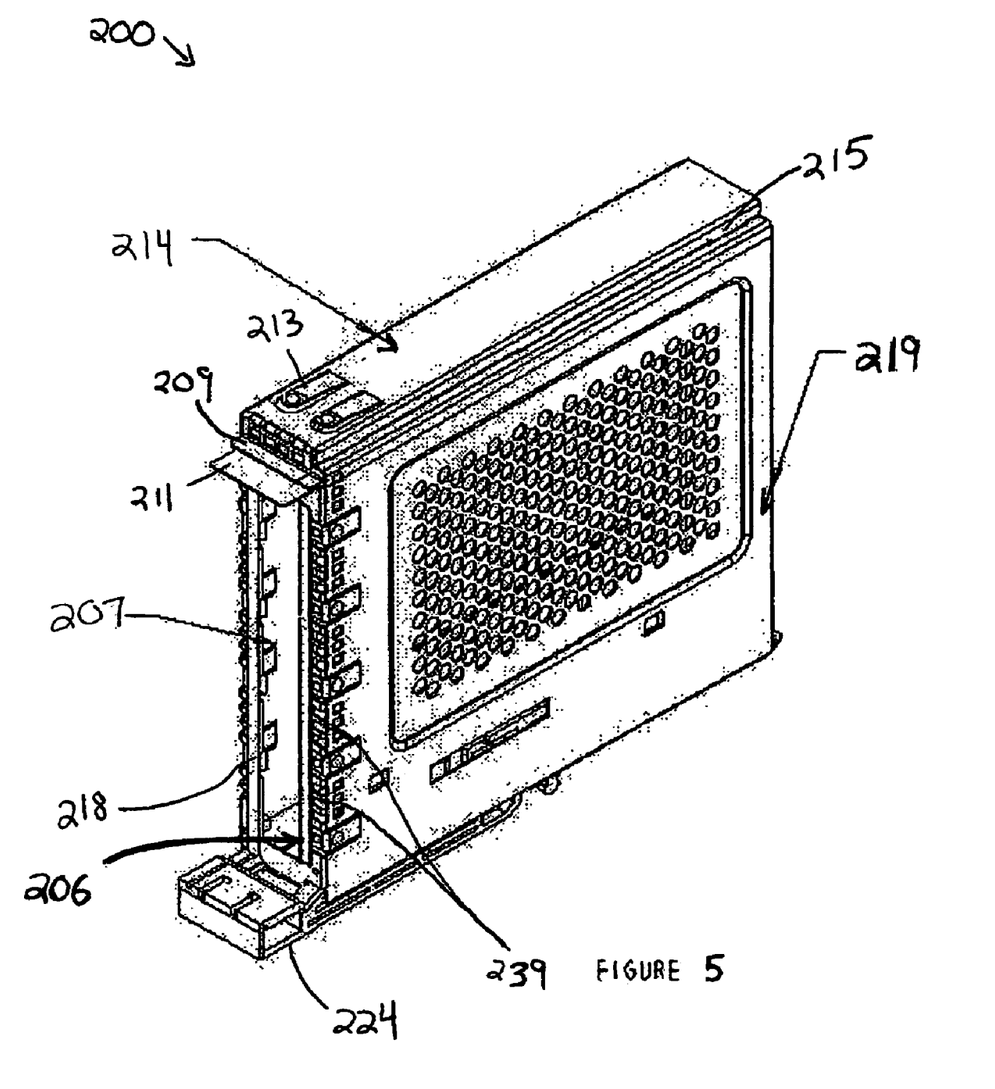
FIG. 5 is a perspective view of a card adapter module in accordance with aspects of the invention.

FIG. 5 depicts a perspective view of an exemplary card adapter module 200 without a peripheral card 100 inserted. The card adapter housing 206 illustrated in FIG. 5 includes a front side portion 218 that contacts the peripheral card handle (104, FIG. 1), and a top portion 214 that interconnects with a removable housing cover 219 to enclose and secure a peripheral card (100, FIG. 1) within the card adapter module 200. The housing front side portion 218 includes vents 239 to dissipate heat generated from the peripheral card (100, FIG. 1) when the card is powered on and a flange portion 209 which receives and stations a peripheral card flange portion (108, FIG. 1). An opening 207 on the housing front side portion 218 exposes a surface portion of the peripheral card handle when a peripheral card (100, FIG. 1) is inserted within the card adapter module 200. A removable housing cover 219 secures the peripheral card (100, FIG. 1) within the card adapter module 200 along the housing top portion 214 and includes vents to dissipate heat.

Figure 6:
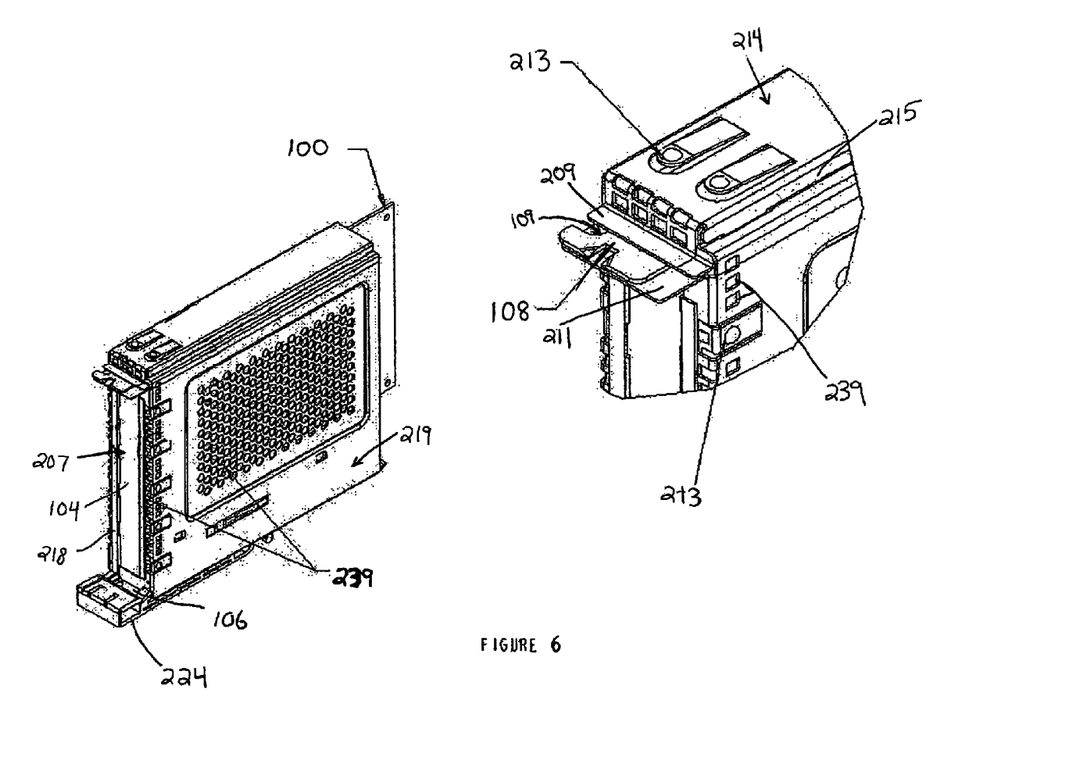
FIG. 6 is a perspective view of the peripheral card of FIG. 1 inserted within the card adapter module of FIG. 5 in accordance with aspects of the invention.

FIG. 6 depicts a perspective view of a peripheral card 100 inserted within the card adapter module 200 of FIG. 5. As described above in FIGS. 1, 2, 2A, 3 and 5, the peripheral card 100, which is attached to the card adapter module 200, includes a printed circuit board 101 with a board connector 102 that is connected to the card connector 203. The card connector 203 is electrically connected to the peripheral connector 205 such that when the peripheral connector 205 is connected to a platform connector 245 on a computing platform 250, the peripheral card 100 becomes electrically connected to the computing platform 250. When the peripheral card 100 is inserted into the card adapter module 200, tab 106 of the peripheral card handle (104, FIG. 1) is secured within the front side portion 218 on the housing 206. A surface portion of the peripheral card handle 104 is exposed through an opening 207 on the front side portion 218.

A removable housing cover 219 interconnects with the housing top portion 214 to further secure the peripheral card 100 within the card adapter module 200. When the removable housing cover 219 is fully inserted into slots 215 on the top portion 214, peripheral card flange portion 108 on the peripheral card 100 is sandwiched in between a flange portion 209 on the housing 206 and a flange portion 211 on the removable housing cover 219. The top portion 214 includes an grounding feature 213 to ground the card adapter module 200 and suppress electromagnetic interference (EMI).

The card adapter module 200 can be a configured to receive a variety of peripheral cards such as PCI, PCIe, or AGP type cards. It is contemplated, however, that peripheral cards other than PCI, PCIe, or AGP type cards may be used with the card adapter module 200. Thus, the card adapter module 200 may be a PCI card adapter module, a PCIe card adapter module, an AGP card adapter module, or any other type of card adapter module as long as the card connector 203 is adapted to receive a respective peripheral card. For instance, card connector 203 may be a PCIe connector.

In an exemplary embodiment, the computing platform (250, FIG. 2A) and peripheral card (100, FIG. 1) within the card adapter module 200 are hot swappable such that a card adapter module 200 having a peripheral card (100, FIG. 1) connected thereto via the card connector 203 may be inserted or removed from a computing system (230, FIGS. 2 and 2A) while the system is powered on. Suitable hot swappable peripheral cards and computing platforms that support them will be understood by one of skill in the art from the description herein.

Figure 7:
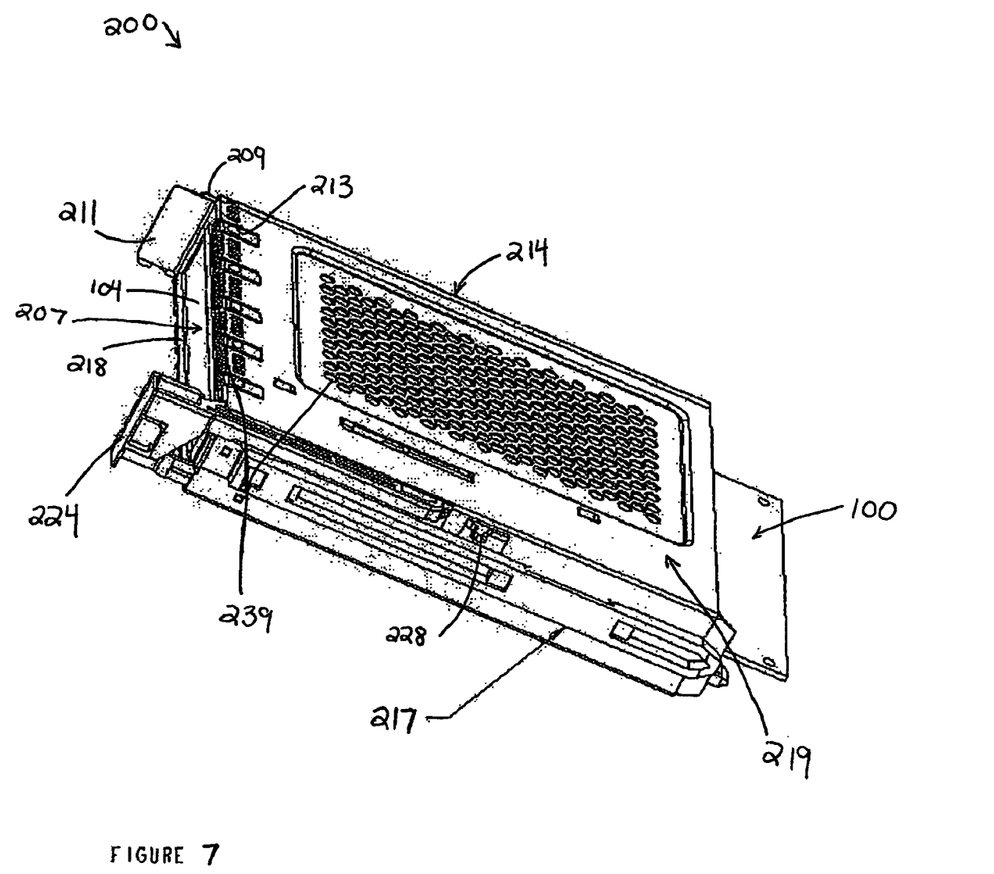
FIG. 7 is another perspective view of the peripheral card of FIG. 1 inserted within the card adapter module of FIG. 5 in accordance with aspects of the invention.

FIG. 7 depicts a perspective view of a peripheral card 100 of FIG. 1 inserted within the card adapter module 200 of FIG. 5 according to exemplary aspects of the present invention. The card adapter module 200 includes a card adapter module guide 217 on the housing portion 206 to facilitate the alignment of the card adapter module 200 into the input/output slot (201, FIGS. 2 and 2A) in the computing system chassis (240, FIGS. 2 and 2A). The computing system chassis (240, FIGS. 2 and 2A) has a mating guide (247, FIG. 2A) for aligning the card adapter module 200 within the input/output slot (201, FIGS. 2 and 2A) of the chassis for insertion. When the card adapter module 200 is aligned with the input/output slot (201, FIGS. 2 and 2A) of the chassis, the peripheral connector 205 is aligned to connect to a platform connector (245, FIG. 2A) on the computing platform (250, FIG. 2A). The removable housing cover 219 of the card adapter module 200 includes a flange 211 which stations a flange (108, FIG. 1) on the peripheral card 100. When a removable housing cover 219 is interconnected to the housing top portion 214 via slots 215, the peripheral card flange portion (108, FIG. 1) is sandwiched in between the flange portion 211 on the removable housing cover 219 and the flange portion 209 on the housing 206. FIG. 7 illustrates the lever assembly 224 in an inserted position and the cam mechanism 228 in a position to secure the card adapter module 202 to the computer system chassis (240, FIGS. 2 and 2A) after insertion to prevent the module 200 from being removed from the chassis.

Figure 8:
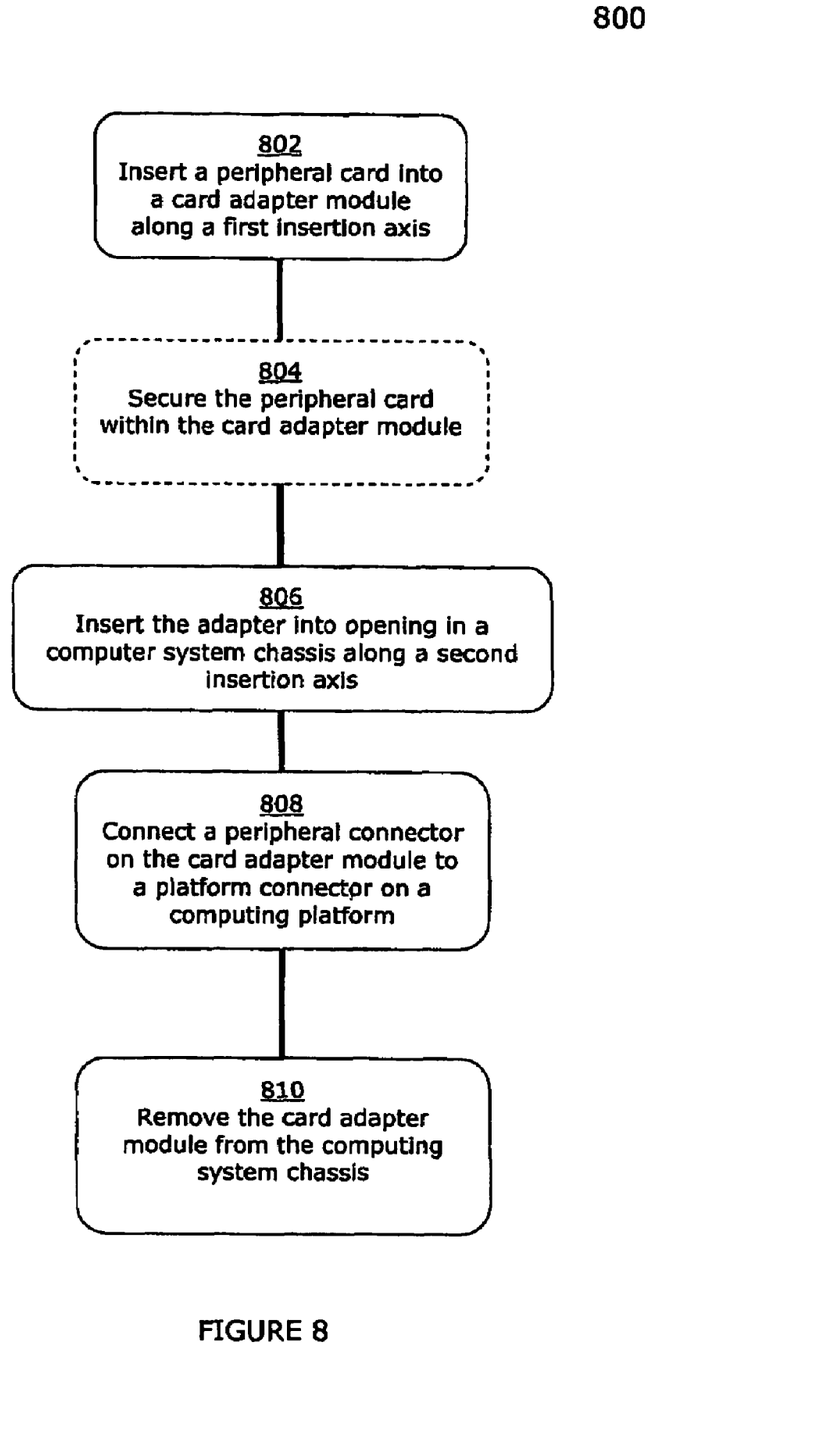
FIG. 8 is a flow chart of exemplary steps for using a card adapter module in accordance with aspects of the invention.

FIG. 8 depicts a flow chart 800 of exemplary steps for using a card adapter module 200 in accordance with the present invention. The steps will be described with reference to FIGS. 1-7.

At step 802, a peripheral card 100 is inserted into a card adapter module 200 along a first insertion axis (e.g., y-axis). In an exemplary embodiment, when the peripheral card 100 is inserted into the card adapter module 200, the card connector 203 connects to the board connector 102 on the peripheral card 100.

Optionally, at step 804, the peripheral card 100 is secured within the card adapter module 200 by securing a peripheral card flange portion 108 to a flange portion 209 on the housing 206. A removable housing cover 219 may then be inserted over the peripheral card 100 through slots 215 on the housing top portion 214. In an exemplary embodiment, the insertion of the peripheral card 100 into the card adapter module 200 secures the peripheral card 100 within the adapter 200 in which case step 804 may be omitted.

At step 806, the card adapter module 200 with an attached peripheral card 100 is inserted into an input/output slot 201 of a computer system chassis 240 along a second insertion axis (e.g., x-axis) extending through the input/output slot 201 of the chassis 240, wherein the second insertion axis is different than the first insertion axis.

At step 808, a peripheral connector 205 on the card adapter module 200 is connected to a platform connector 245 on the computing platform 250 through insertion of the card adapter module 200 along the second insertion axis. When the peripheral connector 205 is connected to the platform connector 245, the peripheral card 100 is electrically connected to a computing platform 250 such as a computer motherboard. In an exemplary embodiment, when the card adapter module 200 is connected to a platform connector 245 on the computing platform, a lever assembly 224 may be positioned to an inserted position to compress a cam mechanism 228 and lock the card adapter module 200 in the computing system chassis 240 to prevent removal of the module 200.

At step 810, the card adapter module 200 is removed. In an exemplary embodiment, the card adapter module 200 is removed by moving the lever assembly 224 to an partially extracted position, thereby extending the cam mechanism 228 and unlocking the card adapter module 200 from the computing system chassis 240. In response, the computing system 230 may send an indicator to the card adapter module 200 causing a red LED 220b to flash. When the computer system 230 determines that it is safe to remove the card adapter module 200, the computing system 230 may send an indicator to the card adapter module 200 that causes the red LED 220b to illuminate continuously, thereby indicating that it is safe to remove the card. In an alternative exemplary embodiment, system control software for the computing system 230 may power down the card adapter module 200, based on or independent of the movement of the lever assembly 224, thereby causing the red LED 220b to illuminate continuously to indicate that it is safe to remove the card adapter module 200.

Although the present invention has been particularly described in conjunction with specific embodiments, many alternatives, modifications, and variations will be apparent to those skilled in the art. It is therefore contemplated that the appended claims will embrace any such alternatives, modifications, and variations as falling within the true scope and spirit of the present invention.

What is claimed is:

1. A card adapter module for electrically connecting a peripheral card to a computing platform through an input/output slot in a chassis housing the computing platform, the computing platform having at least one platform connector, the card adapter module comprising:
   a card connector adapted to receive the peripheral card along a first insertion axis;
   a peripheral connector electrically connected to said card connector, said peripheral connector adapted to receive a platform connector of the computing platform along a second insertion axis extending through the input/output slot in the chassis, the second insertion axis different than the first insertion axis, whereby the peripheral card is electrically coupled to the computing platform when the card connector receives the peripheral card and the peripheral connector receives the platform connector; and
   a housing that supports the card connector and the peripheral connector, wherein the peripheral card includes at least one flange portion and the housing has at least one flange portion configured to receive and station the at least one flange portion on the peripheral card.

2. The card adapter module according to claim 1, wherein the card connector is a PCIe connector.

3. The card adapter module according to claim 1, wherein the first insertion axis is substantially perpendicular to the second insertion axis.

4. The card adapter module according to claim 1, wherein the computing platform and peripheral card within the card adapter module are hot swappable.

5. The card adapter module according to claim 1, wherein the housing includes an adapter guide and wherein the chassis further has a mating guide for mating with the adapter guide to align the card adapter module within the input/output slot of the chassis.

6. The card adapter module according to claim 1, wherein the card adapter module includes status light emitting diodes (LEDs) configured to indicate when the card adapter module may be safely disconnected from the computing platform.

7. The card adapter module according to claim 1, wherein the housing includes a top portion and a removable cover that interconnects with the top portion to enclose and secure the peripheral card within the card adapter module.

8. The card adapter module according to claim 1, wherein the housing includes a cam mechanism to secure the card adapter module to the chassis.

9. The card adapter module according to claim 1, wherein the housing includes a circuit assembly to support and interconnect the card connector and the peripheral connector.

10. A computing system comprising:
   a chassis having an input/output slot;
   a computing platform housed within the chassis, the computing platform having at least one platform connector;
   a card adapter module for electrically connecting a peripheral card to the computing platform, the card adapter module comprising:
   a card connector adapted to receive the peripheral card along a first insertion axis;
   a peripheral connector electrically connected to said card connector, said peripheral connector adapted to receive the at least one platform connector of the computing platform along a second insertion axis extending through the input/output slot of the chassis, the second insertion axis different than the first insertion axis, whereby the peripheral card is electrically coupled to the computing platform when the card connector receives the peripheral card and the peripheral connector receives the platform connector; and a housing that supports the card connector and the peripheral connector, wherein the housing includes a cam mechanism to secure the card adapter module to the chassis.

11. The computing system according to claim 10, wherein the first insertion axis is substantially perpendicular to the second insertion axis.

12. The computing system according to claim 10, wherein the housing includes an adapter guide and wherein the chassis further has a mating guide for mating with the adapter guide to align the card adapter module within the input/output slot of the chassis.

13. The computing system according to claim 10, wherein the card adapter module includes status light emitting diodes (LEDs) configured to indicate when the card adapter module may be safely disconnected from the computing platform.

14. A method for electrically connecting a peripheral card to a computing platform within a computing system chassis, the computing system chassis having an input/output slot for receiving a card adapter module and the computing platform having a platform connector, the method comprising the steps of:

inserting the peripheral card into a card connector of the card adapter module along a first insertion axis;

securing the peripheral card within a housing of the card adapter module such that at least one flange portion of the card adapter module housing receives and stations at least one flange portion of the peripheral card;

inserting the card adapter module into an input/output slot in the computing system chassis along a second insertion axis extending through the input/output slot of the computing system chassis, the second insertion axis different than the first insertion axis; and connecting a peripheral connector of the card adapter module to the platform connector of the computing platform through insertion of the card adapter module along the second insertion axis to electrically connect the peripheral card to the computing platform.

15. The method according to claim 14, wherein the card adapter module includes a top portion and a removable housing and wherein the securing step includes attaching the removable housing to the top portion to enclose the peripheral card within the card adapter module.

16. The method according to claim 14, wherein the card adapter module includes a guide and the computing system chassis includes a mating guide and wherein the inserting step includes aligning the guide of the card adapter module with the mating guide of the computer chassis.

17. A card adapter module for electrically connecting a peripheral card to a computing platform through an input/output slot in a chassis housing the computing platform, the computing platform having at least one platform connector, the card adapter module comprising:

a card connector adapted to receive the peripheral card along a first insertion axis;

a peripheral connector electrically connected to said card connector, said peripheral connector adapted to receive a platform connector of the computing platform along a second insertion axis extending through the input/output slot in the chassis, the second insertion axis different than the first insertion axis, whereby the peripheral card is electrically coupled to the computing platform when the card connector receives the peripheral card and the peripheral connector receives the platform connector;

a housing that supports the card connector and the peripheral connector; and at least one status light emitting diode (LED) configured to indicate when the card adapter module may be safely disconnected from the computing platform.

18. A card adapter module for electrically connecting a peripheral card to a computing platform through an input/output slot in a chassis housing the computing platform, the computing platform having at least one platform connector, the card adapter module comprising:

a card connector adapted to receive the peripheral card along a first insertion axis;

a peripheral connector electrically connected to said card connector, said peripheral connector adapted to receive a platform connector of the computing platform along a second insertion axis extending through the input/output slot in the chassis, the second insertion axis different than the first insertion axis, whereby the peripheral card is electrically coupled to the computing platform when the card connector receives the peripheral card and the peripheral connector receives the platform connector; and a housing that supports the card connector and the peripheral connector, wherein the housing includes a cam mechanism to secure the card adapter module to the chassis.

* * * * *